United States Patent Office 3,169,564
Patented Feb. 16, 1965

3,169,564
PROCESS FOR PEELING WAXY FRUIT
Winfred O. Harrington, Philadelphia, and Claude H. Hills, Flourtown, Pa., assignors to the United States of America as represented by the Secretary of Agriculture
No Drawing. Filed May 2, 1963, Ser. No. 277,662
8 Claims. (Cl. 146—235)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to peeling fruit, and particularly relates to peeling waxy skinned fruit.

Commercial processing of fruit often requires removal of an external covering or skin. In some instances, as with the tomato or peach, the skin is relatively easy to remove, and damage to, or loss of, flesh of the fruit is usually minimal.

Waxy skinned fruits, as exemplified by the apple, require more rigorous physical or chemical treatment to remove the skin. When lye peeling is applied to apples, digestion proceeds very slowly at temperatures below about 140° F. Raising the temperature of the lye solution increases the loss of flesh of the apple due to cooking and alkaline digestion beneath the skin. Moreover, holding an apple at a temperature of 160° F. or higher for longer than a few minutes causes a marked weakening of structure so that the apple tends to crumble or squash, with adverse results on subsequent handling and manipulation.

An object of the present invention is to provide a process for expediting the peeling of waxy skinned fruits. Another object is to accomplish the peeling more rapidly with an equal or better yield of peeled product. Other objects and a fuller understanding of the invention may be had by referring to the following description and claims.

We have discovered that the use of a wax removing agent, as a pretreatment or in conjunction with lye solution, reduces the time required for peeling apples to as little as one-fourth the time required for peeling at the same temperature with only the lye solution.

According to the present invention a waxy skinned fruit is peeled by a process comprising contacting said fruit with a wax solvent and a lye solution under conditions of concentration, time and temperature sufficient to peel the fruit without substantial damage to the remainder of the fruit.

In one embodiment of the present invention the wax solvent is combined with the lye solution and dewaxing occurs in conjunction with digestion of the peel or skin. In this process the waxy skinned fruit is contacted with a peeling solution comprising at least about a 10% aqueous lye solution containing at least 5%, preferably 10% or more, of a wax solvent such as ethyl or isopropyl alcohol, or mixtures thereof, at a temperature in the range of about 120 to 175° F. for about 14 to 1 minutes, the longer time being employed at the lower temperature, removing the fruit from the peeling solution and rising to provide a peeled product.

In another embodiment of the present invention the waxy skinned fruit is first contacted with a wax solvent such as a short carbon chain alcohol or low molecular weight ester thereof, at temperatures up to about 175° F., preferably at a temperature below about 160° F., for less than one minute at the higher temperatures. The fruit is then contacted with at least about a 10% aqueous lye solution at temperatures in the range of 120 to 175° F. for about 10 to 1 minutes, respectively, to digest and remove or loosen the peel, followed by removal from the lye solution and rinsing.

The practice of the process of the present invention was demonstrated by peeling several varieties of apples. While there are slight differences from one apple to another, enough replications at each set of conditions were conducted so that the averages give a significant value, and the same variety, or group of varieties were used in comparing various peeling procedures.

The overall processing times of the two embodiments, employing comparable concentrations and temperatures, are about the same. While the separate dewaxing step requires an additional piece of equipment in the processing line there are the advantages that the solvent and dissolved wax may be subsequently separated and the solvent recycled and that the lye solution is not contaminated as rapidly.

The selection of a solvent is primarily dependent upon use of one which is readily removed in the wash water. Benzene and methanol are excellent solvents, but their toxicity discourages use in food processing. Accordingly, preferred solvents are ethyl alcohol, isopropyl alcohol and ethyl acetate. Since the latter hydrolyses in lye solution, and concentrations of above about 10% isopropyl alcohol exhibit phase separation in 10% NaOH, the preferred solvent for adding to lye solution is ethyl alcohol.

In control peeling processes in which the temperature was constant and the concentration of lye varied from 10 to 30%, a maximum rate of peeling was obtained at about 15 to 20% lye, depending upon the temperature. For example, at 120° F. the time of peeling decreased from 15 minutes with 10% lye to 13 minutes with 15% lye. Then the trend was reversed, increasing to 17 minutes with 30% lye.

When 5% ethanol was added to lye solutions the peeling times at 120° F. for 10%, 15% through 25%, and 30% lye solutions were 14, 12 and 13 minutes, respectively. We discovered, however, that the presence of 10% or more ethanol had a different effect on peeling times of lye solutions of concentrations greater than 25%. Peeling times for 10%, 15%, 20%, 25% and 30% lye solutions were 13, 11, 10, 10 and 8 minutes, respectively. Correspondingly, when the ethanol concentration was 25%, the peeling times were 9, 8, 8, 8, and 6 minutes at a temperature of 120° F. Hence, the addition of alcohol not only results in a marked decrease in peeling time at all levels of lye concentration, but makes it feasible to use lye concentrations of 25% to 30%.

As noted above, at a constant level of alcohol, the peeling time did not decrease appreciably from about 15% through 25% lye concentrations. Since, as will be demonstrated hereinafter, rapid peeling processes can be achieved in this range, a level of 20% sodium hydroxide, potassium hydroxide, or mixtures thereof, was selected as the basis for comparing the other variables in the process. As mentioned previously, about 15 to 20% is the optimum level for the lye control, and it will be apparent that the improvement of the present combination process would be compounded if comparisons were based on a 30% lye concentration.

The data for average peeling time requirements at various temperatures for 20% sodium hydroxide solution and a combination of 20% ethanol in 20% sodium hydroxide are presented in Table 1. This combination process reduces the peeling time from about one-half to one-fourth the time required with lye alone at the same temperature.

Increasing to 75% the ethanol content of 20% lye solution reduces the peeling time at 120° F. to 4 minutes, or about one-fourth the time required with 20% lye.

As a further illustration of the combination process, apples were peeled in 30% KOH containing 66% ethyl alcohol at a temperature of about 140° F. Under these conditions the apples were peeled in about one minute.

The level of solvent selected by the operator will be influenced by the equipment available with consideration of the effect of solvent on viscosity of the solution and loss of solvent by evaporation. When operating at temperatures below about 160° F. a wax solvent concentration of about 10% or higher is considered preferable.

As previously noted, the apple should not be subjected to temperatures of 160° F. or higher for any appreciable amount of time unless the intention is to cook the apple.

Apples peeled by lye only, even with shorter times at higher temperatures, frequently had roughened or somewhat cratered surface due to action of the caustic solution. The addition of alcohol reduces or obviates this effect, giving a product which is generally smooth and firm. The firmness, primarily attributed to the shorter time the apple is heated to a given temperature, is especially important in further processing, facilitating subsequent operations and minimizing loss due to crumbling and sloughing.

One of the operations is to remove particles of peel, both free particles and those still attached to the apple. This is accomplished in a rinsing procedure, preferably a rinsing in which the water is applied as a plurality of jets of water. Alternatively, the particles were removed by a light brushing. Since rinsing is desired to remove excess alkali, in practice the rinsing may be accompanied or followed by a gentle brushing or rubbing action, although the combination is considered an optional procedure.

In the separate dewaxing step process the wax is removed from the fruit most rapidly when the solvent contains less than about 10% water, as obtained with 90–95% ethanol or 90–98% isopropanol. Times of one minute or less are sufficient with a concentrated alcohol solution.

Contacting the waxy fruit with solvents at their boiling point; as by dipping, spraying, or condensation of hot vapor; is a rapid means of removing wax, but the time of the exposure of fruit to this temperature must be more closely controlled than procedures in which the temperature is below 160° F.

Table 2 contains data obtained for the peeling process in which the dewaxing was performed in a separate, prior step. Upon discovering that apples which were adequately dewaxed could be peeled in 4 minutes or less in 20% lye at 140° F., the peeling treatment was standardized at these conditions. The exposure time of 1 minute to only ⅓ minute in the wax solvent at 140° F. to boiling, in combination with subsequent lye peeling at 140° F. did not soften the fruit, and upon rinsing, a firm, smooth, and peel free product was obtained.

The product is satisfactory for use in any commercial process in which a peeled fruit is desired.

TABLE 1

*Peeling requirements in time and temperature for different solutions*

| Peeling Solution Temperature, ° F. | Peeling Time Required For— | |
|---|---|---|
| | 20% NaOH, min. | 20% NaOH, 20% Ethyl Alcohol, min. |
| 120 | 16 | 9 |
| 140 | 10 | 5 |
| 150 | 8 | 4 |
| 160 | 6 | 2–2.5 |
| 170 | 5 | 1.5 |
| 175–180 | 4 | 1 |

TABLE 2

*Effect of dewaxing prior to lye peeling*

| Dewaxing Treatment 95% Ethyl Alcohol | | Peeling Treatment 20% NaOH | |
|---|---|---|---|
| Time | Temperature, ° F. | Time | Temperature, ° F. |
| 1 min | 154 | 4 min | 140 |
| ½ min | 160 | 2½ min | 140 |
| ½ min | 170 | 2½ min | 140 |
| ⅓ or ½ min | Boiling | 3 min | 140 |

| Isopropyl Alcohol 98% plus | | | |
|---|---|---|---|
| 1 min | 140 | 4 min | 140 |
| 1 min | 150 | 3 min | 140 |
| ½ min | 160 | 3 min | 140 |
| ⅓ min | Boiling | 2½ min | 140 |

We claim:
1. A process for peeling a waxy skinned fruit comprising contacting said fruit with at least about a 10% lye solution containing at least about 5% of a wax solvent selected from the group consisting of ethyl alcohol, isopropyl alcohol, and mixtures thereof, at a temperature in the range of about 120 to 175° F. for about 14 to 1 minutes, the longer time being employed at the lower temperature, removing said fruit from the lye solution and rinsing in water to provide a peeled fruit product.

2. The process of claim 1 in which the lye solution is about 20% sodium hydroxide, the wax solvent is about 20% ethyl alcohol and the temperature is about 150° F.

3. The process of claim 1 in which the lye solution is about 30% sodium hydroxide, the wax solvent is about 25% ethyl alcohol and the temperature is about 140° F.

4. The process of claim 1 in which the lye solution is 30% potassium hydroxide, the wax solvent is 66% ethyl alcohol, and the temperature is about 140° F.

5. A process for peeling a waxy skinned fruit comprising contacting said fruit with a wax solvent at a temperature in the range of about 140 to 175° F. for up to about one minute; contacting the solvent treated fruit with at least about a 10% lye solution at a temperature in the range of about 120 to 175° F. for about 10 to 1 minutes, the longer time being employed at the lower temperature, and rinsing the lye treated fruit in water to provide a peeled fruit product.

6. The process of claim 3 in which the wax solvent is selected from the group consisting of ethyl alcohol, isopropyl alcohol, ethyl acetate and mixtures thereof.

7. The process of claim 4 in which the wax solvent is about 95% ethanol, the lye solution is about 20% sodium hydroxide and the temperature of the lye solution is about 140° F.

8. The process of claim 4 in which the wax solvent is about 98% isopropanol, the lye solution is about 20% sodium hydroxide and the temperature of the lye solution is about 140° F.

References Cited by the Examiner

UNITED STATES PATENTS

| 1,884,966 | 10/32 | Robinson | 99—103 |
| 2,530,272 | 11/50 | Thrasher | 146—232 X |
| 2,847,334 | 8/58 | Kilburn et al. | 146—241 X |

FOREIGN PATENTS 510,328  2/55  Canada.

J. SPENCER OVERHOLSER, *Primary Examiner.*